United States Patent
Ebigt et al.

(10) Patent No.: US 8,528,348 B2
(45) Date of Patent: Sep. 10, 2013

(54) COOLING SYSTEM FOR COOLING HEAT LOADS ON BOARD AN AIRCRAFT AND METHOD FOR OPERATING SUCH A COOLING SYSTEM

(75) Inventors: Wolfgang Ebigt, Hamburg (DE); Wilson Willy Casas Noriega, Hamburg (DE); Andreas Frey, Immenstaad (DE); Dirk Kastell, Hamburg (DE)

(73) Assignee: Airbus Deutschland GmbH (DE)

( * ) Notice: Subject to any disclaimer, the term of this patent is extended or adjusted under 35 U.S.C. 154(b) by 960 days.

(21) Appl. No.: 12/438,489

(22) PCT Filed: Aug. 17, 2007

(86) PCT No.: PCT/EP2007/007295
§ 371 (c)(1),
(2), (4) Date: Jun. 3, 2009

(87) PCT Pub. No.: WO2008/025462
PCT Pub. Date: Mar. 6, 2008

(65) Prior Publication Data
US 2009/0321062 A1    Dec. 31, 2009

Related U.S. Application Data

(60) Provisional application No. 60/840,551, filed on Aug. 28, 2006.

(30) Foreign Application Priority Data

Aug. 28, 2006    (DE) .................. 10 2006 040 191

(51) Int. Cl.
*F25B 7/00*    (2006.01)
(52) U.S. Cl.
USPC .... 62/79; 62/113; 62/175; 62/335; 62/DIG. 5

(58) Field of Classification Search
USPC ................... 62/79, 113, 175, 335, DIG. 5
See application file for complete search history.

(56) References Cited

U.S. PATENT DOCUMENTS

| 5,279,130 A | 1/1994 | Donaldson |
| 5,687,579 A * | 11/1997 | Vaynberg .................. 62/175 |

(Continued)

FOREIGN PATENT DOCUMENTS

| EP | 0710807 A2 | 5/1996 |
| EP | 1609718 A1 | 12/2005 |

(Continued)

OTHER PUBLICATIONS

Decision to Grant (English Translation) issued by the Russian Patent Office on Mar. 28, 2011 (4 pages).

(Continued)

*Primary Examiner* — Marc Norman
*Assistant Examiner* — Jonathan Bradford
(74) *Attorney, Agent, or Firm* — Barnes & Thornburg LLP

(57) ABSTRACT

An aircraft cooling system for cooling heat loads on board an aircraft includes a cold producing device, a first cold carrier fluid circuit thermally coupled to the cold producing device and connected to a first heat load in order to carry off heat from the first heat load, a second cold carrier fluid circuit connected to a second heat load in order to carry off heat from the second heat load, a heat exchanger disposed in the second cold carrier fluid circuit and configured to thermally couple the second cold carrier fluid circuit to an ambient temperature surrounding the aircraft, and a coupling system configured to selectively thermally couple the first cold carrier fluid circuit to the second cold carrier fluid circuit or thermally uncouple it from the second cold carrier fluid circuit.

12 Claims, 2 Drawing Sheets

(56) References Cited

U.S. PATENT DOCUMENTS 6,938,429 B2 * 9/2005 Katogi et al. .................. 62/175
2003/0042361 A1 3/2003 Simadiris et al.

FOREIGN PATENT DOCUMENTS

| FR | 2610999 A1 | 8/1998 |
| RU | 2111152 C1 | 5/1998 |
| WO | WO 2005/063568 A1 | 7/2005 |

OTHER PUBLICATIONS

PCT International Search Report for PCT/EP2007/007295 completed by the EP Searching Authority on Dec. 20, 2007.

* cited by examiner

__US 8,528,348 B2__

COOLING SYSTEM FOR COOLING HEAT LOADS ON BOARD AN AIRCRAFT AND METHOD FOR OPERATING SUCH A COOLING SYSTEM

CROSS-REFERENCE TO RELATED APPLICATIONS

This application is a U.S. national counterpart application of international application serial No. PCT/EP2007/007295 filed Aug. 17, 2007, which claims priority to German Patent Application No. 102006040191.3 filed Aug. 28, 2006 and to U.S. Provisional Patent Application No. 60/840,551 filed Aug. 28, 2006.

TECHNICAL FIELD

The invention relates to a cooling system for cooling heat loads on board an aircraft, which comprises a cold producing device, a first cold carrier fluid circuit, which is thermally coupled to the cold producing device and is connected to a first heat load in order to carry off heat from the first heat load, and a second cold carrier fluid circuit, which is connected to a second heat load in order to carry off heat from the second heat load. Furthermore, the invention relates to a method for operating such a cooling system.

BACKGROUND

A known cooling system suitable for use on board an aircraft comprises a central cold producing device which is thermally coupled to a cold carrier fluid circuit in order to carry off heat from a plurality of heat loads connected, in parallel, to the cold carrier fluid circuit. The heat loads may be at different temperature levels, depending on the operating state, so that the heat transmission from the heat loads to the cold carrier fluid circuit must take place at different temperature levels. In order to ensure proper functioning of the entire system, the operating temperature level of the cold producing device must therefore always be selected such that heat loads which are at a low temperature level are also sufficiently cooled. Consequently, the cold producing device must be operated at an energetically unfavourable low operating temperature level and therefore at a relatively poor efficiency.

A further known cooling system for cooling heat loads on board an aircraft comprises a first cold carrier fluid circuit, which carries off heat from heat loads which are at a low temperature level to a cold producing device. The cold producing device transmits the heat, carried off by the first cold carrier fluid circuit, to a second cold carrier fluid circuit, which serves to carry off heat from heat loads which are at a relatively high temperature level. A heat exchanger, which gives off to the surroundings the heat to be carried off from the entire system, is arranged in the second cold carrier fluid circuit. In order to ensure proper functioning of the entire system at high ambient temperatures as well, the second cold carrier fluid circuit must be maintained at a relatively high temperature level. For this reason, it is necessary to operate the cold producing device at an energetically unfavourable high operating temperature level on the side giving off heat and thus at a relatively poor efficiency. Owing to a technical limitation of the maximum operating temperature of the cold producing device and of further heat loads coupled into the second cold carrier fluid circuit, proper operation of the entire system at very high ambient temperatures can no longer be ensured.

SUMMARY

The invention is directed to the object to provide a cooling system for cooling heat loads on board an aircraft, which enables heat loads at different temperature levels to be cooled in an energy-efficient manner.

To achieve the aforementioned object, a cooling system according to the invention for cooling heat loads on board an aircraft which includes a cold producing device, a first cold carrier fluid circuit, which is thermally coupled to the cold producing device and is connected to a first heat load in order to carry off heat from the first heat load, and a second cold carrier fluid circuit, which is connected to a second heat load in order to carry off heat from the second heat load, comprises a coupling system which is adapted to selectively thermally couple the first cold carrier fluid circuit to the second cold carrier fluid circuit or thermally uncouple it from the second cold carrier fluid circuit. In other words, in the case of the cooling system according to the invention, the coupling system serves, as required, to make or break a thermal connection between the first and second cold carrier fluid circuits.

In the case of the cooling system according to the invention, which enables selective thermal coupling or uncoupling of the first and second cold carrier fluid circuits, it is possible, at high ambient temperatures, to use the cold producing device coupled to the first cold carrier fluid circuit also for cooling the second cold carrier fluid circuit. This is particularly advantageous when it is not possible to carry off sufficient heat from the second cold carrier fluid circuit to the surroundings owing to the high ambient temperatures. In contrast, at average ambient temperatures, by uncoupling the first and second cold carrier fluid circuits, only the first heat load connected to the first cold carrier fluid circuit can be cooled via the cold producing device. In contrast, the second heat load connected to the second cold carrier fluid circuit can be cooled, for example, by carrying off the heat to the surroundings. At low ambient temperatures, finally, by coupling the first and second cold carrier fluid circuits, the second cold carrier fluid circuit can be used to cool the first cold carrier fluid circuit. As a result, the cold producing device connected to the first cold carrier fluid circuit can be switched off or at least relieved. An increase in energy efficiency with falling ambient temperatures is thereby obtained for the entire system according to the invention. Furthermore, even at very high ambient temperatures, the cooling function is ensured for both cold carrier fluid circuits.

A cold vapour process cooling machine can be employed as the cold producing device in the cooling system according to the invention. Such an apparatus usually comprises a cooling medium circuit, in which an expansion valve and a compressor are arranged. The cold producing device preferably comprises a condenser, which is arranged in the cooling medium circuit and serves to carry off heat to the surroundings. For thermal coupling of the cold producing device to the first cold carrier fluid circuit, the cold producing device preferably has an evaporator, which is connected to the first cold carrier fluid circuit. By way of example, the cold carrier fluid flowing through the first cold carrier fluid circuit is led through the evaporator of the cold producing device in order to carry off heat from the first cold carrier fluid circuit and thus from the first heat load.

A cold carrier liquid is preferably employed as the cold carrier fluid in the cooling system according to the invention. As an alternative to this, however, the use of a two-phase or of a gaseous cold carrier fluid is also conceivable. To circulate the cold carrier fluid through the first cold carrier fluid circuit, a conveying device designed, for example, in the form of a pump can be arranged in the first cold carrier fluid circuit. The cold carrier fluid flowing through the second cold carrier fluid circuit is preferably likewise circulated by means of a conveying device designed, for example, in the form of a pump.

In a preferred embodiment of the cooling system according to the invention, the coupling system comprises a first valve, which is arranged in the first cold carrier fluid circuit. The first valve is preferably adapted to selectively lead cold carrier fluid, flowing through the first cold carrier fluid circuit, through a first bypass line or bring it into thermal contact with cold carrier fluid flowing through the second cold carrier fluid circuit. As an alternative to this, the coupling system can also comprise a first valve, which is arranged in the second cold carrier fluid circuit and is adapted to selectively lead cold carrier fluid, flowing through the second cold carrier fluid circuit, through a first bypass line or bring it into thermal contact with cold carrier fluid flowing through the first cold carrier fluid circuit.

The first valve, which is arranged in the first or second cold carrier fluid circuit, is preferably designed in the form of a three-way valve, so that it can also lead the cold carrier fluid, flowing through the first or second cold carrier fluid circuit, partially through the first bypass line and bring it partially into thermal contact with the cold carrier fluid flowing through the respective other cold carrier fluid circuit. Furthermore, the first valve preferably has a variable flow cross-section, so that a volume flow proportion, led through the first bypass line, of the cold carrier fluid flowing through the first or second cold carrier fluid circuit and a volume flow proportion of the cold carrier fluid flowing through the first or second cold carrier fluid circuit and brought into thermal contact with the cold carrier fluid in the respective other cold carrier fluid circuit can be controlled as desired.

The coupling system of the cooling system according to the invention further preferably comprises a first heat exchanger, which is connected to the second cold carrier fluid circuit and is selectively connectable to or separable from the first cold carrier fluid circuit by the first valve. As an alternative to this, the coupling system of the cooling system according to the invention can also comprise a first heat exchanger, which is connected to the first cold carrier fluid circuit and is selectively connectable to or separable from the second cold carrier fluid circuit by the first valve.

The first heat exchanger produces an indirect thermal coupling between the first and second cold carrier fluid circuits. Such an arrangement makes it possible, for example, to operate the first and second cold carrier fluid circuits with different cold carrier fluids, if required. Furthermore, the first and second cold carrier fluid circuits are hydraulically uncoupled from one another, which ensures increased reliability in the event of leakage in one cold carrier fluid circuit, owing to the availability of the other cold carrier fluid circuit independently thereof.

In an alternative embodiment of the cooling system according to the invention, the first heat exchanger for producing a thermal coupling between the first and second cold carrier fluid circuits is dispensed with. Instead, the coupling system in the alternative embodiment of the cooling system according to the invention has a first connecting line, which is connected to the first valve, and a second connecting line, which is connected to a second valve. By means of the first and second connecting lines, which can be selectively freed or interrupted by the first and second valves respectively, the first and second cold carrier fluid circuits can be connected to one another. In this way, a direct coupling of the first and second cold carrier fluid circuits is made possible, so that the first and second cold carrier fluid circuits can be connected to form a single cold carrier fluid circuit.

Compared with a coupling system comprising a first heat exchanger, a coupling system comprising only a first and second connecting line and a first and second valve has a simple and lightweight construction, so that a weight saving is possible compared with the coupling system comprising a first heat exchanger. A coupling system which brings about a direct hydraulic coupling of the first and second cold carrier fluid circuits can, however, only be employed when the first and second cold carrier fluid circuits are operated with the same cold carrier fluid.

The first and second valves are preferably designed in the form of three-way valves with a variable flow cross-section. Cold carrier fluid flowing through the first cold carrier fluid circuit can then be led, for example, partially via the first bypass line and partially via the first connecting line into the second cold carrier fluid circuit, the volume flows respectively led into the first bypass line and the second cold carrier fluid circuit being adjustable in a specific manner.

A third valve is preferably arranged in the second cold carrier fluid circuit and is adapted to lead cold carrier fluid, flowing through the second cold carrier fluid circuit, selectively through a second heat exchanger and/or a second bypass line. The third valve is preferably likewise designed in the form of a three-way valve with a variable flow cross-section, so that the cold carrier fluid flowing through the second cold carrier fluid circuit can also be led partially through the second heat exchanger and partially through the second bypass line. The second heat exchanger is preferably adapted to carry off heat from the second cold carrier fluid circuit to the surroundings. The third valve is therefore preferably controlled in dependence on the ambient temperature and in dependence on the quantity of heat produced by the heat load arranged in the second cold carrier fluid circuit.

In the case of a method according to the invention for operating an above-described cooling system for cooling heat loads on board an aircraft, the first cold carrier fluid circuit is selectively thermally coupled to the second cold carrier fluid circuit or thermally uncoupled from the second cold carrier fluid circuit by means of the coupling system.

Preferably, the cold carrier fluid flowing through the first or second cold carrier fluid circuit is selectively led through a first bypass line or brought into thermal contact with cold carrier fluid flowing through the second or first cold carrier fluid circuit by means of a first valve, which is arranged in the first or second cold carrier fluid circuit.

A first heat exchanger, which is connected to the first or second cold carrier fluid circuit, is selectively connected to or separated from the second or first cold carrier fluid circuit by the first valve.

As an alternative to this, the first cold carrier fluid circuit can also be selectively connected to or separated from the second cold carrier fluid circuit by the first valve, which is connected to a first connecting line, and a second valve, which is connected to a second connecting line.

In a preferred embodiment of the method according to the invention for operating a cooling system for cooling heat loads on board an aircraft, cold carrier fluid flowing through the second cold carrier fluid circuit is selectively led through a second heat exchanger and/or a second bypass line by means of a third valve, which is arranged in the second cold carrier fluid circuit.

BRIEF DESCRIPTION OF THE DRAWINGS

Two preferred exemplary embodiments of a cooling system according to the invention for cooling heat loads on board an aircraft are now explained in more detail with reference to the appended schematic drawings, of which.

DETAILED DESCRIPTION OF THE DRAWINGS

Figure 1:
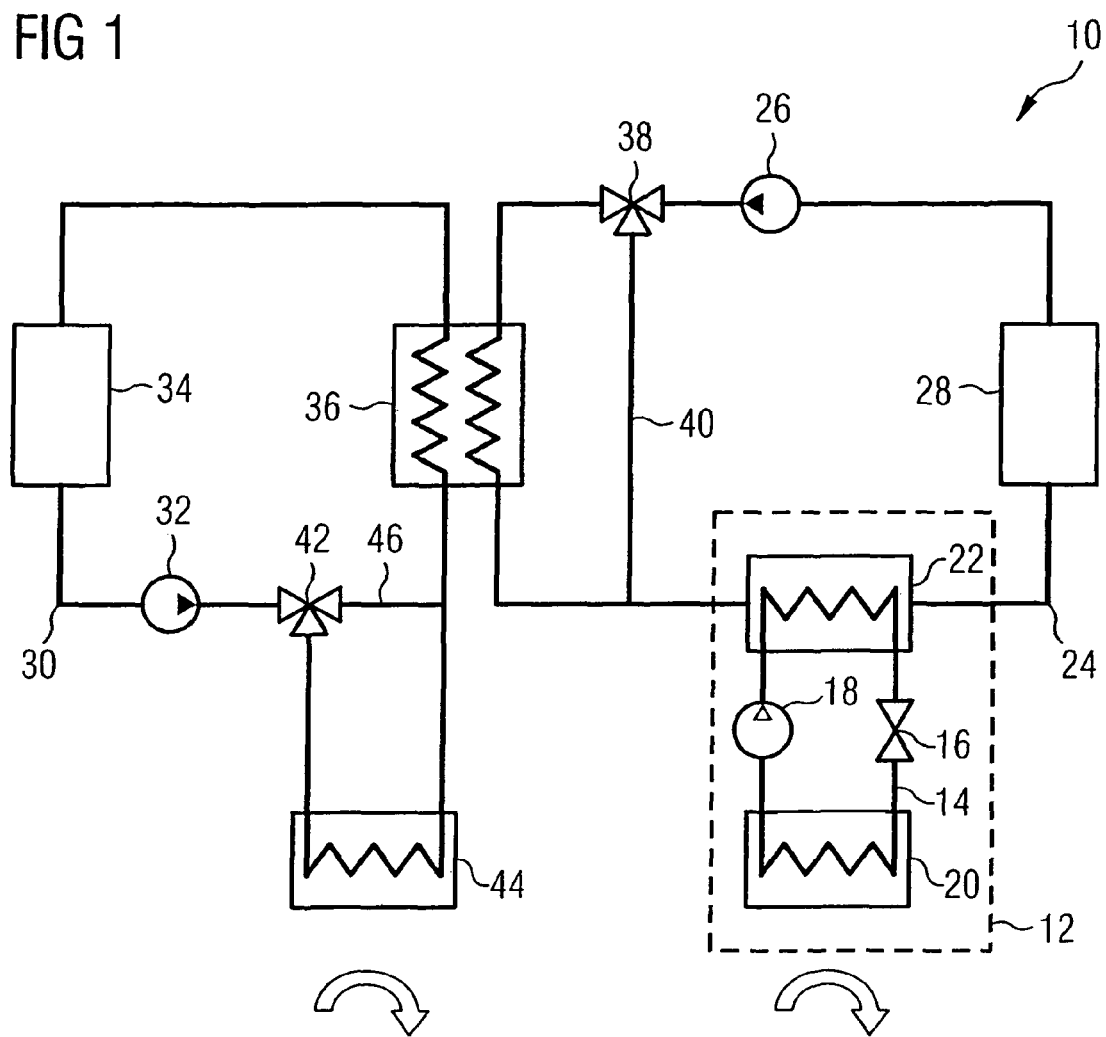
FIG. 1 shows a first embodiment of a cooling system according to the invention.

FIG. 1 shows a first exemplary embodiment of a cooling system 10 suitable for use on board an aircraft. The cooling system 10 comprises a cold producing device 12, which is designed in the form of a cold vapour process cooling machine and has a cooling medium circuit 14, in which an expansion valve 16 and a compressor 18 are arranged. Also arranged in the cooling medium circuit 14 of the cold producing device 12 is a condenser 20, which serves to carry off heat to the surroundings.

An evaporator 22 of the cold producing device 12 is connected to a first cold carrier fluid circuit 24, cold carrier fluid, flowing through the first cold carrier fluid circuit 24, being led through the evaporator 22 in order to transmit heat from the first cold carrier fluid circuit 24 to the cold producing device 12. The cold carrier fluid flowing through the first cold carrier fluid circuit is conveyed through the first cold carrier fluid circuit 24 by means of a first pump 26 in order to carry off heat from a first heat load 28 arranged in the first cold carrier fluid circuit 24.

The cooling system 10 further comprises a second cold carrier fluid circuit 30, in which a cold carrier fluid is circulated by means of a second pump 32 in order to carry off heat from a second heat load 34. The temperature level of the second heat load 34 is higher than the temperature level of the first heat load 28.

The cold carrier fluid circulating in the second cold carrier fluid circuit 30 is led through a first heat exchanger 36. In contrast, the first cold carrier fluid circuit 24, connected to the cold producing device 12, is selectively connectable to or separable from the first heat exchanger 36. For this purpose, a first three-way valve 38 is arranged in the first cold carrier fluid circuit 24 downstream of the first pump 26. The first three-way valve 38 serves to lead the cold carrier fluid, flowing through the first cold carrier fluid circuit 24, selectively through the first heat exchanger 36 or through a first bypass line 40.

The first heat exchanger 36, the first three-way valve 38 and the first bypass line 40 thus form a coupling system, which selectively thermally couples the first cold carrier fluid circuit 24 to the second cold carrier fluid circuit 30 or thermally uncouples it from the second cold carrier fluid circuit 30. The first three-way valve 38 has a variable flow cross-section, so that it is possible to lead the cold carrier fluid, flowing through the first cold carrier fluid circuit 24, partially through the first heat exchanger 36 and partially through the first bypass line 40, the proportion of the volume flows, led respectively through the first heat exchanger 36 and the first bypass line 40, of the cold carrier fluid flowing through the first cold carrier fluid circuit 24 being adjustable as required.

In the second cold carrier fluid circuit 30 a further three-way valve 42 is arranged downstream of the second pump 32, which valve leads the cold carrier fluid, flowing through the second cold carrier fluid circuit 30, selectively through the second heat exchanger 44 or through a second bypass line 46. The second head exchanger 44 serves to carry off heat from the second cold carrier fluid circuit 30 and thus from the second heat load 34 to the surroundings. The further three-way valve 42 likewise has a variable flow cross-section, so that it is possible to lead the cold carrier fluid, flowing through the second cold carrier fluid circuit 30, partially through the second heat exchanger 44 and partially through the second bypass line 46, the proportion of the volume flows, led respectively into the second heat exchanger 44 and the second bypass line 46, of the cold carrier fluid flowing through the second cold carrier fluid circuit 30 again being adjustable, by a corresponding control of the further three-way valve 42, as desired.

In the text which follows, the functioning of the cooling system shown in FIG. 1 is explained. If the ambient temperature is sufficiently low, the heat produced by the second heat load 34 can be carried off to the surroundings via the second heat exchanger 44 by a corresponding control of the further three-way valve 42. A certain flow temperature in this case results in the second cold carrier fluid circuit 30.

During this operating phase of the cooling system 10, the first cold carrier fluid circuit 24 is separated from the second cold carrier fluid circuit 30 by a corresponding control of the first three-way valve 38. In other words, the cold carrier fluid circulating in the first cold carrier fluid circuit 24 is led solely through the first bypass line 40. During this operating phase of the cooling system 10, the operating temperature of the cold producing device 12 can be adapted to the relatively low temperature level of the first heat load 28. As a result, particularly energy-efficient operation of the cold producing device 12 is possible.

At a higher ambient temperature, it may no longer be possible to carry off sufficient heat from the second cold carrier fluid circuit 30 via the second heat exchanger 44. Consequently, the flow temperature in the second cold carrier fluid circuit 30 rises. If, owing to an increased flow temperature in the second cold carrier fluid circuit 30, it is no longer ensured that the heat will be properly carried off from the second heat load 34, the second cold carrier fluid circuit 30 can be thermally coupled to the first cold carrier fluid circuit 24, which is at a lower temperature level, via the first heat exchanger 36.

For this purpose, the first three-way valve 38 is controlled in such a way that the first bypass line 40 is partially or completely closed and the cold carrier fluid circulating in the first cold carrier fluid circuit 24 is led through the first heat exchanger 36. As a result, excess heat can be transmitted from the second cold carrier fluid circuit 30 to the first cold carrier fluid circuit 24 via the first heat exchanger 36. Complete shutting of the first bypass line 40 by the first three-way valve 38 is required particularly when the ambient temperature is higher than the inlet temperature of the cold carrier fluid, flowing through the second cold carrier fluid circuit 30, into the second heat exchanger 44.

In contrast, at a sufficiently low ambient temperature, the temperature level in the second cold carrier fluid circuit 30 can be lowered below the temperature level in the first cold carrier fluid circuit 24. For this purpose, the further three-way valve 42 is controlled in such a way that the cold carrier fluid flowing through the second cold carrier fluid circuit 30 is predominantly or completely led through the second heat exchanger 44. When the temperature level in the second cold carrier fluid circuit 30 lies below the temperature level in the first cold carrier fluid circuit 24, it is also possible to carry off heat from the first heat load 28 via the second cold carrier fluid circuit 30 and the second heat exchanger 44 to the surroundings by a corresponding thermal coupling of the first and second cold carrier fluid circuits 24, 30 via the first heat exchanger 36. As a result, the cold producing device 12 can be relieved.

Figure 2:
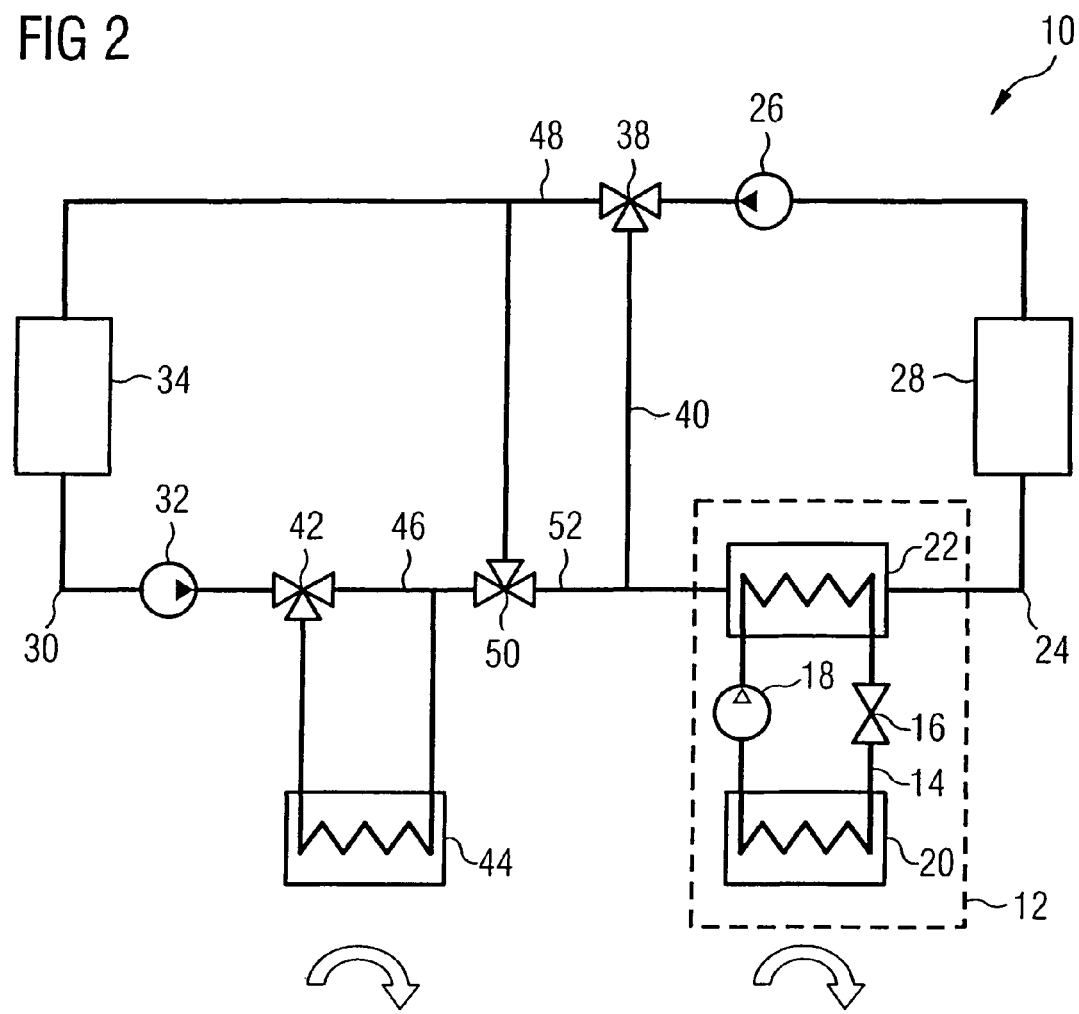
FIG. 2 shows a second embodiment of a cooling system according to the invention.

The second exemplary embodiment of a cooling system 10, shown in FIG. 2, differs from the arrangement illustrated in FIG. 1 essentially in that a heat exchanger for producing a thermal coupling between the first and second cold carrier fluid circuits 24, 30 has been dispensed with. Instead, the coupling system of the cooling system 10 comprises, besides the first three-way valve 38 and the first bypass line 40, a first connecting line 48, which is connected to the first three-way valve 38, a second three-way valve 50 and a second connecting line 52, which is connected to the second three-way valve 50.

The first and second three-way valves 42, 50 each have variable flow cross-sections. Cold carrier fluid flowing through the first cold carrier fluid circuit 24 can thus be led partially into the first bypass line 40 and partially, via the first connecting line 48, into the second cold carrier fluid circuit 30 by corresponding control of the first three-way valve 38, the volume flow proportions of the cold carrier fluid led respectively into the first bypass line 40 and, via the first connecting line 48, into the second cold carrier fluid circuit 30 being adjustable as required. Similarly, the cold carrier fluid flowing through the second cold carrier fluid circuit 30 can be partially further circulated in the second cold carrier fluid circuit 30 and partially led, via the second connecting line 52, into the first cold carrier fluid circuit 24 by corresponding control of the second three-way valve 50.

By a corresponding control of the first and second three-way valves 38, 50, a direct hydraulic coupling of the first and second cold carrier fluid circuits 24, 30 is thus possible. In other respects, the construction and functioning of the cooling system 20 shown in FIG. 2 corresponds to the construction and functioning of the arrangement illustrated in FIG. 1.

The invention claimed is:

1. An aircraft cooling system for cooling heat loads on board an aircraft, said aircraft cooling system comprising:
   a cold producing device,
   a first cold carrier fluid circuit thermally coupled to the cold producing device and connected to a first heat load in order to carry off heat from the first heat load,
   a second cold carrier fluid circuit connected to a second heat load in order to carry off heat from the second heat load,
   a first heat exchanger disposed in the second cold carrier fluid circuit and configured to thermally couple the second cold carrier fluid circuit to an ambient temperature surrounding the aircraft, and
   a coupling system configured to selectively thermally couple the first cold carrier fluid circuit to the second cold carrier fluid circuit or thermally uncouple the first cold carrier fluid circuit from the second cold carrier fluid circuit,
   wherein the second cold carrier fluid circuit is not thermally coupled with a cold-vapour process cooling machine if the coupling system thermally uncouples the first and second cold carrier fluid circuits.

2. The aircraft cooling system according to claim 1, wherein the first heat load is at a lower temperature level than the second heat load.

3. The aircraft cooling system according to claim 1, wherein the coupling system comprises a first valve arranged in the first or second cold carrier fluid circuit and configured to selectively lead cold carrier fluid, flowing through the first or second cold carrier fluid circuit, through a first bypass line or bring it into thermal contact with cold carrier fluid flowing through the second or first cold carrier fluid circuit.

4. The aircraft cooling system according to claim 3, wherein the coupling system comprises a second heat exchanger connected to the first or second cold carrier fluid circuit and selectively connectable to or separable from the second or first cold carrier fluid circuit by the first valve.

5. The aircraft cooling system according to claim 3, wherein the coupling system comprises a first connecting line connected to the first valve, and a second connecting line connected to a second valve, for connection of the first and second cold carrier fluid circuits.

6. The aircraft cooling system according to claim 1, wherein a valve is arranged in the second cold carrier fluid circuit and is configured to lead cold carrier fluid, flowing through the second cold carrier fluid circuit, selectively through at least one of the first heat exchanger and a bypass line.

7. A method for operating an aircraft cooling system for cooling heat loads on board an aircraft having a cold producing device, a first cold carrier fluid circuit thermally coupled to the cold producing device and connected to a first heat load in order to carry off heat from the first heat load, a second cold carrier fluid circuit connected to a second heat load in order to carry off heat from the second heat load, and
   a first heat exchanger disposed in the second cold carrier fluid circuit and configured to thermally couple the second cold carrier fluid circuit to an ambient temperature surrounding the aircraft, the method comprising:
   selectively thermally coupling or uncoupling the first cold carrier fluid circuit to or from the second cold carrier fluid circuit via a coupling system, wherein the second cold carrier fluid circuit is not thermally coupled with a cold-vapour process cooling machine when the coupling system selectively thermally uncouples the first cold carrier fluid circuit from the second cold carrier fluid circuit.

8. A method according to claim 7, further comprising bringing cold carrier fluid flowing through the first or second cold carrier fluid circuit into thermal contact with cold carrier fluid flowing through the second or first cold carrier fluid circuit via a first valve arranged in the first or second cold carrier fluid circuit.

9. A method according to claim 8, further comprising selectively connecting or separating a second heat exchanger, which is connected to the first or second cold carrier fluid circuit, to from the second or first cold carrier fluid circuit by the first valve.

10. A method according to claim 8, further comprising selectively connecting or separating the first cold carrier fluid circuit to or from the second cold carrier fluid circuit by the first valve connected to a first connecting line and a second valve connected to a second connecting line.

11. A method according to claim 7, further comprising selectively leading cold carrier fluid flowing through the second cold carrier fluid circuit through at least one of the first heat exchanger and a second bypass line via a valve arranged in the second cold carrier fluid circuit.

12. A method according to claim 7, further comprising selectively leading cold carrier fluid flowing through the first or second cold carrier fluid circuit through a first bypass line arranged in the first or second cold carrier fluid circuit.

* * * * *